United States Patent [19]

Riat et al.

[11] 4,066,389

[45] Jan. 3, 1978

[54] SULFOPHENYLAMINO CONTAINING TETRAREACTIVE TRIAZINE DISAZO DYESTUFFS AND DYESTUFF COMPOSITIONS THEREOF

[75] Inventors: Henri Riat, Arlesheim; Gert Hegar, Schonenbuch, both of Switzerland

[73] Assignee: Ciba-Geigy Corporation, Ardsley, N.Y.

[21] Appl. No.: 647,846

[22] Filed: Jan. 9, 1976

[30] Foreign Application Priority Data

Jan. 15, 1975 Switzerland .......................... 471/75

[51] Int. Cl.² ...................... C09B 62/08; D06P 1/382; D06P 3/10; D06P 3/66
[52] U.S. Cl. ............................................. 8/41 R; 8/13; 8/41 B; 8/50; 8/51; 8/63; 8/71; 8/163; 8/165; 260/153
[58] Field of Search ............................ 260/153, 146 T

[56] References Cited

U.S. PATENT DOCUMENTS

| | | | |
|---|---|---|---|
| 2,768,158 | 10/1956 | Strobel et al. ....................... | 260/153 |
| 3,117,957 | 1/1964 | Boyd et al. ............................ | 260/153 |
| 3,149,100 | 9/1964 | Hindermann et al. ............... | 260/153 |
| 3,261,825 | 7/1966 | Lesslie et al. ....................... | 260/153 |
| 3,497,494 | 2/1970 | Budziarek ............................ | 260/153 |
| 3,639,662 | 2/1972 | Griffiths et al. ................. | 260/146 T |
| 3,646,002 | 2/1972 | Andrew et al. ...................... | 260/153 |
| 3,647,778 | 3/1972 | Andrew et al. ...................... | 260/153 |
| 3,658,782 | 4/1972 | Griffiths et al. .................... | 260/153 |
| 3,664,995 | 5/1972 | Andrew et al. ...................... | 260/153 |
| 3,966,705 | 6/1976 | Oesterlein et al. .................. | 260/153 |

*Primary Examiner*—Floyd D. Higel
*Attorney, Agent, or Firm*—Edward McC. Roberts; Michael W. Glynn

[57] ABSTRACT

Tetrareactive disazo dyestuffs of the formula

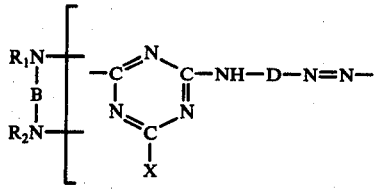

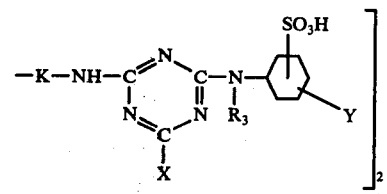

wherein D represents a benzene radical containing at least one sulpho group; K represents a radical of 1-amino(or aminobenzoylamino)-8-naphthol-3,6-disulphonic acid, of 1-amino(or aminobenzoylamino)-8-naphthol-4,6-disulphonic acid, of 2-amino(or aminobenzoylamino)-5-naphthol-7-sulphonic acid, of 2-amino(or aminobenzoylamino)-8-naphthol-6-sulphonic acid, of 2-amino(or aminobenzoylamino)-5-naphthol-1,7-disulphonic acid, or of 2-amino(or aminobenzoylamino)-8-naphthol-3,6-disulphonic acid; B represents an aliphatic or aromatic radical; $R_1$, $R_2$ and $R_3$ each independently represent hydrogen or alkyl having 1 to 6 carbon atoms; X represents chlorine, bromine or fluorine; and Y represents hydrogen, low-molecular alkyl or alkoxy, acetylamino, halogen, carboxy or sulpho; said dyestuffs being useful in dyeing materials such as silk, leather, wool, superpolyamide fibers, superpolyurethanes and fibrous cellulose containing materials, the dyeings being characterized by high depth of color and good fastness to light and wet processing, such as washing.

5 Claims, No Drawings

SULFOPHENYLAMINO CONTAINING TETRAREACTIVE TRIAZINE DISAZO DYESTUFFS AND DYESTUFF COMPOSITIONS THEREOF

The present invention relates to tetrareactive disazo dyestuffs of the formula

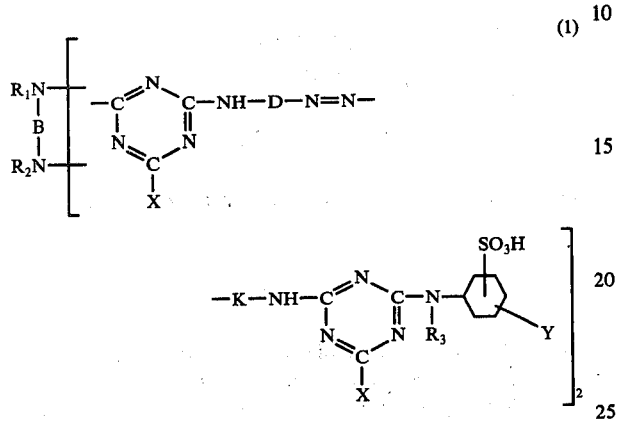

wherein D represents a benzene radical containing at least one sulpho group; K represents a radical of 1-amino (or aminobenzoylamino)-8-naphthol-3,6-disulphonic acid, of 1-amino(or aminobenzoylamino)-8-naphthol-4,6-disulphonic acid, of 2-amino(or aminobenzoylamino)-5-naphthol-7-sulphonic acid, of 2-amino(or aminobenzoylamino)-8-naphthol-6-sulphonic acid, of 2-amino(or aminobenzoylamino)-5-naphthol-1,7-disulphonic acid, or of 2-amino(or aminobenzoylamino)-8-naphthol-3,6-disulphonic acid; B represents an aliphatic or aromatic radical; $R_1$, $R_2$ and $R_3$ each independently represent hydrogen or alkyl having 1 to 6 carbon atoms; X represents chlorine, bromine or fluorine; and Y represents hydrogen, low-molecular alkyl or alkoxy, acetylamino, halogen, carboxy or sulpho.

The benzene radical D can contain, besides sulphonic acid groups, further substituents; these are in particular: alkyl groups such as methyl ethyl, isopropyl or butyl, alkoxy groups such as methoxy, ethoxy, ethoxyethoxy or isopropoxypropoxy, acyl groups such as acetyl, acylamino groups such as acetylamino or benzoylamino, the ureido and carboxy group, and halogen atoms such as chlorine or bromine.

The aliphatic or aromatic radical B is derived from an aliphatic or aromatic diamine. Thus B can be a long (e.g. having 10 or more carbon atoms) or shorter, straight-chain or branched-chain alkylene radical; it can be in particular an alkylene radical having 1 to 6 carbon atoms, e.g. ethylene propylene, butylene, hexylene or cyclohexylene. Preferably B is an aromatic radical, e.g. a naphthylene radical, the radical of diphenyl or stilbene, or especially a phenylene radical. This can contain further substituents, e.g. halogen atoms, low-molecular alkyl and alkoxy groups, amino acylamino, ureido, hydroxy, carboxy and sulpho groups. Preferably B is a phenylene radical.

Alkyl radical denoted by $R_1$, $R_2$ and $R_3$ having 1 to 6 carbon atoms are, e.g., methyl ethyl, propyl, isopropyl, butyl or cyclohexyl. Suitable as substituents Y are alkyl groups such as methyl, ethyl, isopropyl or butyl, alkoxy groups such as methoxy or ethoxy, halogen atoms such as chlorine or bromine, the carboxy group and, in particular, the sulpho group.

The halogen atoms X on the s-triazine radicals of the tetrareactive disazo dyestuffs of the formula (1) can be identical or different.

In one embodiment of the invention, K is

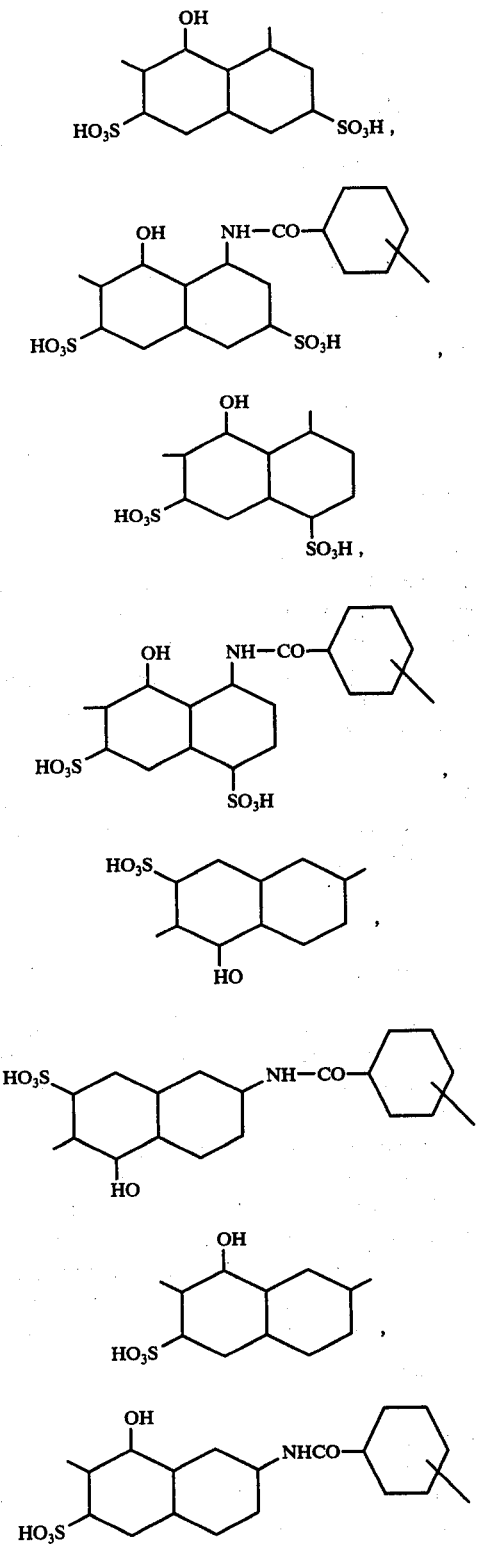

-continued

[Structure: naphthalene with HO₃S, SO₃H, HO substituents]

[Structure: naphthalene with HO₃S, SO₃H, NHCO-cyclohexyl-methyl, HO]

[Structure: naphthalene with OH, HO₃S, SO₃H, or]

[Structure: naphthalene with HO, HO₃S, NHCO-cyclohexyl-methyl, SO₃H]

Preferred are tetrareactive disazo dyestuffs wherein D represents the radical of 1,3-diaminobenzene-4-sulphonic acid, K represents the radical of 1-amino-8-naphthol-3,6-disulphonic acid or the radical of 2-amino-5-naphthol-7-sulphonic acid, B represents an aromatic radical, $R_1$, $R_2$ and $R_3$ represent hydrogen, X represents chlorine, and Y represents hydrogen, sulpho, chlorine, methyl or carboxy, with the sulpho group, or Y if Y is a substituent other than the sulpho group, in the terminal benzene radical being in the ortho-position with respect to the $$-\underset{\underset{R_3}{|}}{N}-\text{group.}$$

By virtue of the presence of four halogen atoms X, which can be split off, in the four s-triazine radicals of the disazo dyestuffs of the formula (1), these dyestuffs are fibre(tetra)reactive.

By fibre-reactive compounds are meant those that are able to react with the hydroxy groups of the cellulose, or with the amino groups of natural or synthetic polyamides, to form covalent chemical bonds.

The tetrareactive disazo dyestuffs of the formula (1) are manufactured by a process in which diazo components of the formula $$H_2N-D-NH_2 \quad (2),$$

coupling components of the formula $$K-NH_2 \quad (3),$$

trihalogeno-s-triazines of the formula

[Structure: triazine with three X substituents] (4), aminobenzenesulphonic acids of the formula

[Structure: benzene ring with SO₃H, HN-R₃, Y] (5)

and aliphatic or aromatic diamines of the formula $$R_1N-B-NR_2 \quad (6)$$
$$\phantom{R_1N}|\phantom{-B-}|$$
$$\phantom{R_1N}H\phantom{-B-}H$$

are combined by means of coupling and condensation to give tetrareactive disazo dyestuffs of the formula (1).

Since the individual steps of the process can be performed in varying sequence, optionally in some cases also simultaneously, various modifications of the process are possible. The starting materials to be used for each partial reaction are embraced by the formula (1).

Important methods of procedure for manufacturing the tetrareactive disazo dyestuffs of the formula (1) are as follows:

a. A diazo component of the formula (2) is condensed with a trihalogeno-s-triazine of the formula (4). The condensation product is diazotised and the product obtained is then coupled to the secondary condensation product from a trihalogeno-s-triazine of the formula (4), a coupling component of the formula (3) and an aminobenzenesulphonic acid of the formula (5). The resulting monoazo compound is condensed in the final stage with an aliphatic or aromatic diamine of the formula (6) in the molar ratio of 2:1.

b. 2 moles of a trihalogeno-s-triazine of the formula (4) are condensed with 2 moles of a diazo component of the formula (2) and with 1 mole of an aliphatic or aromatic diamine of the formula (6). The condensation product is diazotised and the product obtained is coupled to the condensation product from a trihalogeno-s-triazine of the formula (4) and a coupling component of the formula (3). The resulting product is subsequently condensed with 2 moles of an aminobenzenesulphonic acid of the formula (5).

c. The procedure is carried out as under (b) except that in the final stage the product obtained is coupled to the secondary condensation product from a trihalogeno-s-triazine of the formula (4), a coupling component of the formula (3) and an aminobenzenesulphonic acid of the formula (5).

d. 2 moles of a trihalogeno-s-triazine of the formula (4) are condensed with 1 mole of an aliphatic or aromatic diamine of the formula (6); and the condensation product is condensed with 2 moles of a diazo component of the formula (2). The formed disecondary condensation product is tetrazotised, and the product obtained is coupled to 2 moles of a coupling component of the formula (3). The resulting disazo compound is condensed with 2 moles of a trihalogeno-s-triazine of the formula (4); and the condensation product obtained therefrom is condensed finally with 2 moles of an aminobenzenesulphonic acid of the formula (5).

In the case of the process variants (b) and (c), the condensation of the trihalogeno-s-triazine of the formula (4) with the diazo component of the formula (2) may be performed first and with the aliphatic or aromatic diamine of the formula (6) second, or vice versa.

In the process variant (d), it is also possible to condense 2 moles of trihalogeno-s-triazine of the formula (4) firstly with 2 moles of a diazo component of the formula (2) and subsequently with 1 mole of an aliphatic or aromatic diamine of the formula (6), and to then proceed as described. It is furthermore possible in process variant (d) to combine the condensations performed in the penultimate stage and final stage with 2 moles of trihalogeno-s-triazine of the formula (4) and 2 moles of an aminobenzenesulphonic acid of the formula (5), respectively, and to condense with 2 moles of the primary condensation product from a trihalogeno-s-triazine of the formula (4) and an aminobenzenesulphonic acid of the formula (5).

The variant (a) is the preferred procedure for the manufacture of the tetrareactive disazo dyestuffs of the formula (1).

As starting materials there are preferably used: as diazo component of the formula (2) 1,3-diaminobenzene-4-sulphonic acid; as coupling component of the formula (3) 1-amino-8-naphthol-3,6-disulphonic acid or 2-amino-5-naphthol-7-sulphonic acid, a trihalogeno-s-triazine of the formula (4) wherein X is chlorine, an aminobenzenesulphonic acid of the formula (5) wherein $R_3$ is hydrogen, and Y represents hydrogen or a sulpho group, with the sulpho group or Y being in the ortho-position with respect to the

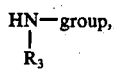

and an aromatic diamine of the formula (6) wherein $R_1$ and $R_2$ represent hydrogen.

Diazotisation of the diazo components of the formula (2) is performed by methods known per se, e.g. with the aid of hydrochloric acid and sodium nitrite. Coupling with the coupling components of the formula (3) is likewise performed by methods known per se in an aqueous, acid or alkaline medium.

Condensation with trihalogeno-s-triazines, diazo components of the formula (2), coupling components of the formula (3), aminobenzenesulphonic acids of the formula (5) and aliphatic or aromatic diamines of the formula (6) is performed advantageously with the use of acid-binding agents, such as sodium carbonate or sodium hydroxide, and under such conditions that in the finished tetrareactive disazo dyestuff of the formula (1) there still remains one halogen atom per s-triazine ring, i.e. in organic solvents or at relatively low temperature in an aqueous medium.

The following may be mentioned as starting materials for manufacturing the fibre-reactive disazo compounds of the formula (1):

DIAZO COMPONENTS 1,3-diaminobenzene-4-sulphonic acid,
1,4-diaminobenzene-2-sulphonic acid,
1,4-diaminobenzene-2,6-disulphonic acid,
1,4-diaminobenzene-2,5-disulphonic acid,
1,4-diamino-2-chlorobenzene-5-sulphonic acid,
1,4-diamino-2-methylbenzene-5-sulphonic acid,
3-(3'-or 4'-aminobenzoylamino)-1-aminobenzene-6-sulphonic acid,
1-(4'-aminobenzoylamino)-4-aminobenzene-2,5-disulphonic acid.

COUPLING COMPONENTS 1-amino-8-naphthol-3,6-disulphonic acid,
1-aimino-8-naphthol-4,6-disulphonic acid,
2-aimino-5-naphthol-7-sulphonic acid,
2-amino-8-naphthol-6-sulphonic acid,
2-amino-8-naphthol-3,6-disulphonic acid,
2-amino-5-naphthol-1,7-disulphonic acid,
1-(3'-or 4'-aminobenzoylamino)-8-naphthol-3,6-disulphonic acid,
1-(3'- or 4'-aminobenzoylamino)-8-naphthol-4,6-disulphonic acid,
2-(3'- or 4'-aminobenzoylamino)-5-naphthol-7-sulphonic acid,
2-(3'- or 4'-aminobenzoylamino)-8-naphthol-6-sulphonic acid,
2-(3'- or 4'-aminobenzoylamino)-8-naphthol-3,6-disulphonic acid,
2-(3'- or 4'-aminobenzoylamino)-5-naphthol-1,7-disulphonic acid.

TRIHALOGEN-S-TRIAZINES cyanuric chloride, cyanuric bromide or cyanuric fluoride.

ALIPHATIC AND AROMATIC DIAMINES ethylenediamine,
n-propylenediamine,
n-butylenediamine,
1-methyl-n-propylenediamine,
n-hexylenediamine,
2-ethyl-n-butylenediamine,
1,4-cyclohexane-bis-(methylamine),
1,3-diaminobenzene,
1,4-diaminobenzene,
1,3-diamino-4-chlorobenzene,
1,3-diamino-4-methylbenzene,
1,3-diamino-4-ethylbenzene,
1,3-diamino-4-methoxybenzene,
1,3-diamino-4-ethoxybenzene,
2,6-diamino-naphthalene,
1,3-diamino-2,4,6-trimethylbenzene,
1,4-diamino-2,3,5,6-tetramethylbenzene,
1,3-diamino-4-nitrobenzene,
4,4'1 -diaminostilbene,
4,4'1 -diaminodiphenylmethane,
4,4'-diaminodiphenyl (benzidine),
3,3'-dimethylbenzidine,
3,3'-dimethoxybenzidine,
3,3'-dichlorobenzidine,
3,3'-dicarboxybenzidine,
3,3'-dicarboxymethoxy-benzidine,
2,2'-dimethylbenzidine,
4,2'-diaminodiphenyl (diphenyline),
2,6-diaminonaphthalene-4,8-disulphonic acid,
1,4-diaminobenzene-2-sulphonic acid,
1,4-diaminobenzene-2,5-disulphonic acid,
1,4-diaminobenzene-2,6-disulphonic acid,
1,3-diaminobenzene-4-sulphonic acid,
1,3-diaminobenzene-4,6-disulphonic acid,
1,4-diaminobenzene-2-carboxylic acid
1,3-diaminobenzene-4-carboxylic acid
1,4-diamino-2-methylbenzene, 4,4'-diaminodiphenyl oxide,
4,4'-diaminodiphenylurea-2,2'-disulphonic acid,
4,4'-diaminodiphenyloxyethane-2,2'-disulphonic acid,
4,4'-diaminostilbene-2,2'-disulphonic acid,
4,4'-diaminodiphenylethane-2,2'-disulphonic acid, piperazine.

The new tetrareactive disazo dyestuffs of the formula (1) can be isolated and processed into suitable dry dyestuff preparations. Isolation is effected preferably at the lowest possible temperature by salting out and filtration. The filtered dyestuffs can be dried optionally after the addition of diluents and/or buffer agents, e.g. after the addition of a mixture of equal parts of mono- and disodium phosphate; drying is preferably performed at not too high a temperature and under reduced pressure. By spray drying of the whole of the produced mixture it is possible in certain cases to obtain the dry preparations according to the invention direct, i.e. without intermediate isolation of the dyestuffs.

The dyestuffs are suitable for the dyeing and printing of the widest variety of materials, such as silk, leather, wool, superpolyamide fibres and superpolyurethanes, especially, however, cellulose-containing materials of fibrous structure, such as linen, cellulose, regenerated cellulose and, in particular, cotton. They are especially suitable for dyeing by the exhaust process from a long liquor, from an aqueous alkaline bath having if required a high salt content; and by the pad-dyeing process, wherein the material is impregnated with aqueous, optionally saltcontaining dyestuff solutions, and, after an alkali treatment or in the presence of alkali, the dyestuffs are fixed, if necessary by the action of heat.

The dyestuffs are suitable also for printing, especially on cotton; also for printing of nitrogencontaining fibres, e.g. of wool, silk or wool-containing mixed fabrics. They are characterised, in particular, by an enhanced reactivity and by a good affinity, and hence by a high degree of fixing. They have the advantage also that unfixed constituents can be readily washed out. The dyeings and printings obtained have a high depth of colour and have good fastness to light as well as very good fastness to wet processing, such as good fastness to washing.

For the purpose of improving fastness to wet processing, it is recommended that the dyeings and printings be subjected to a thorough rinsing with cold water and hot water, optionally with the addition of an agent having a dispersing action and promoting the diffusion of the unfixed constituents.

Except where otherwise stated in the following Examples, 'parts' denote parts by weight, percentages are given as percent by weight, and temperature values are expressed in degrees Centigrade. Between parts by weight and parts by volume there exists the same relationship as between gram and cubic centimeter.

EXAMPLE 1

18.8 parts of 1,3-diaminobenzene-6-sulphonic acid are dissolved in 200 parts of water, with the addition of sodium carbonate, at pH 6 to 7. The solution is added to an ice-cold aqueous suspension of 18.5 parts of cyanuric chloride; and the mixture is neutralised, with ice-cooling in the course of 30 minutes, with a diluted sodium hydroxide solution. After completion of condensation, 30 parts of concentrated hydrochloric acid are added and diazotisation is performed with a solution of 6.9 parts of sodium nitrite. The excess of nitrous acid is decomposed with sulphamic acid, and the diazo compound is added to a neutral aqueous solution of 60 parts of the secondary condensation product from cyanuric chloride, 1,8-aminonaphthol-3,6-disulphonic acid and 1-aminobenzene-3-sulphonic acid, with the pH-value being maintained between 6 and 7.5 by the addition of sodium carbonate. After coupling is completed, there is added a solution of 5.4 parts of 1,4-diaminobenzene; the temperature is gradually raised to 35° and condensation is performed at this temperature, whilst the pH-value of the solution is kept between 6 and 7 with a diluted sodium hydroxide solution. After completion of the reaction, the dyestuff solution is concentrated in vacuo to dryness. The tetrareactive disazo dyestuff obtained dyes cellulose fibres in the exhaust process, in the presence of electrolyte and alkali, in red shades.

If there is used in this Example, instead of cyanuric chloride, a corresponding amount of cyanuric bromide, then there is obtained a tetrareactive disazo dyestuff having similar properties.

The following Table contains a number of further examples that can be obtained by the procedure given in Example 1.

| | Diazo component from cyanuric chloride and | Coupling component condensation product from cyanuric chloride and | Diamine | Shade |
|---|---|---|---|---|
| 2 | 1,3-diaminobenzene-6-sulphonic acid | 1,8-aminonaphthol-3,6-disulphonic acid and metanilic acid | 1,3-diaminobenzene | red |
| 3 | " | 1,8-aminonaphthol-3,6-disulphonic acid and orthanilic acid | 1,4-diaminobenzene | red |
| 4 | " | " | 1,3-diaminobenzene | red |
| 5 | " | 2-amino-5-oxynapthaline-7-sulphonic acid and aniline-2,5-disulphonic acid | 1,4-diaminobenzene | orange |
| 6 | " | " | 4,4'-diaminodiphenyl-2,2'-disulphonic acid | orange |
| 7 | " | " | 4,4'-diaminodiphenylurea-2,2'-disulphonic acid | orange |
| 8 | " | 1,8-aminonaphthol-3,6-disulphonic acid and 2-aminotoluene-5-sulphonic acid | 1,4-diaminobenzene | red |
| 9 | " | " | 1,3-diaminobenzene | " |

| | Diazo component from cyanuric chloride and | Coupling component condensation product from cyanuric chloride and | Diamine | Shade |
|---|---|---|---|---|
| 10 | " | 1,8-aminonaphthol-3,6-disulphonic acid and 2-aminotoluene-4-sulphonic acid | 1,4-diaminobenzene | " |
| 11 | " | " | 1,4-diaminobenzene-4-sulphonic acid | " |
| 12 | " | 1,8-aminonaphthol-4,6-disulphonic acid and orthanilic acid | 1,4-diaminobenzene | " |
| 13 | " | " | 4,4'-diaminodiphenyl-2,2'-disulphonic acid | " |
| 14 | 1,4-diaminobenzene-2-sulphonic acid | 1,8-aminonaphthol-3,6-disulphonic acid and 2-chloroaniline-4-sulphonic acid | 1,4-diaminobenzene | bluish red |
| 15 | 4'-(3'-aminobenzoyl-amino)-1-aminobenzene-6-sulphonic acid | " | " | " |
| 16 | 3-(3'-aminobenzoylamino)-1-aminobenzene-6-sulphonic acid | 1,8-aminonaphthol-3,6-disulphonic acid and aniline-2,5-disulphonic acid | " | red |
| 17 | 1-(4'-aminobenzoylamino)-4-aminobenzene-2,5-disulphonic acid | 1,8-aminonaphthol-3,6-disulphonic acid and orthanilic acid | 1,3-diaminobenzene | bluish red |
| 18 | 1,4-diaminobenzene-2,5-disulphonic acid | " | 1,4-diaminobenzene | " |
| 19 | 1,3-diaminobenzene-4,6-disulphonic acid | " | " | red |
| 20 | 1,3-diaminobenzene-6-sulphonic acid | 2-amino-8-hydroxynaphthaline-6-sulphonic acid and aniline-2,5-disulphonic acid | " | scarlet |
| 21 | " | 2-amino-5-hydroxynaphthaline-7-sulphonic acid and metanilic acid | 1,3-diaminobenzene-4-sulphonic acid | orange |
| 22 | " | " | 4,4'-diaminodiphenyl-2,2'-disulphonic acid | " |
| 23 | " | 2-amino-5-hydroxynaphthaline-1,7-disulphonic acid and orthanilic acid | 1,4-diaminobenzene | " |
| 24 | " | 1-(4'-aminobenzoylamino)-8-hydroxynaphthaline-3,6-disulphonic acid and aniline-2,5-disulphonic acid | " | red |

EXAMPLE 25

A neutral solution (sodium salt) of 40.2 parts of 4,4'-diaminodiphenylurea-2,2'-disulphonic acid is introduced into a fine ice-cold suspension of 37 parts of cyanuric chloride, and stirring is maintained at a temperature of 5° until no further amino group is detectable, with the pH-value being kept between 5 and 6 by the dropwise addition of a diluted sodium hydroxide solution. There is then added a solution of 42 parts of sodium salt of 1,3-diaminobenzene-4-sulphonic acid, and the mixture is allowed to react for 1 to 2 hours at 20° to 30°. The reaction mixture is subsequently neutralised with a sodium hydroxide solution; it is acidified with 60 parts of 30% hydrochloric acid, and diazotised with a solution of 14 parts of sodium nitrite at 20°. The tetrazo compound is combined with the neutral solution of 120 parts of the secondary condensation product from cyanuric chloride, 1,8-aminonaphthol-3,6-disulphonic acid and orthanilic acid. Coupling is completed by the addition of 40 parts of bicarbonate. The dyestuff obtained is salted out, filtered off and dried. It dyes cellulose fibres in very fast red shades.

If there is used in this Example, instead of 1,3-diaminobenzene-4-sulphonic acid, the same amount of 1,4-diaminobenzene-2-sulphonic acid to produce the diazo component, then a dyestuff is obtained which dyes cellulose in intensely bluish-red shades.

If instead of diamino-diphenylureadisulphonic acid there is used the corresponding amount of 1,4-diaminobenzene-2,5-disulphonic acid, with the procedure otherwise being as described in the Example, then a similar dyestuff is obtained.

EXAMPLE 26

The tetrazo compound obtained by the procedure of Example 25 is combined with a neutral solution of 94 parts of the condensation product from cyanuric chloride and 1,8-aminonaphthol-3,6-disulphonic acid at 5° to 10°. The pH-value is raised to 7 by the careful dropwise addition of a diluted sodium hydroxide solution. After completion of coupling, a solution of 2-carboxyaniline-4-sulphonic acid is added, and condensation is performed at 30° to 40° at a pH-value of 6 to 7. The tetrareactive dyestuff is then isolated by concentration of the solution by evaporation. The dyestuff obtained dyes cotton in red shades.

EXAMPLE 27

The tetrazo compound obtained by the procedure given in Example 25 is added to an ice-cold solution prepared by dissolving 64 parts of 1,8-aminonaphthol-3,6-disulphonic acid and 60 parts of sodium carbonate in water. After completion of coupling, the reaction mixture is neutralised with hydrochloric acid, and an addition is then made at 5° of a solution of 37 parts of cyanuric chloride in 200 parts of acetone. The reaction mixture is slowly neutralised with a diluted sodium hydroxide solution. After completion of the reaction, there is added a solution of 34.6 parts of metanilic acid; the temperature is raised to 40°, and the mixture is allowed to react for 2 hours at this temperature, with the pH-value being maintained at between 6 and 7 by the dropwise addition of a sodium hydroxide solution. The dyestuff is subsequently salted out, filtered off and dried. It dyes cotton in red shades.

EXAMPLE 28

To a neutral aqueous solution of 24.1 parts of the disodium salt of 1-(4'-aminobenzoylamino)-8-naphthol-3,6-disulphonic acid there are added dropwise at 0° 5 parts by volume of 2,4,6-trifluoro-1,3,5-triazine, with a pH-value of 5 to 6 being maintained by the simultaneous addition of diluted sodium hydroxide solution. After completion of condensation, there are added 9.75 parts of sodium sulphanilate; the reaction mixture is allowed to warm up to room temperature and the hydrogen fluoride released during condensation is neutralised by the dropwise addition of diluted sodium hydroxide solution. To the solution of the coupling component thus obtained there is then added a diazo suspension obtained according to the procedure of Example 1 by condensation of 9.4 parts of 1,3-diaminobenzene-6-sulphonic acid and 9.25 parts of cyanuric chloride and subsequent diazotisation, and the pH-value is held during coupling at between 6 and 7.5 by the addition of sodium carbonate. After coupling is completed there is added a solution of 3.05 parts of 2,4-diaminotoluene in warm water, and condensation is performed at 35° at a pH-value of 6 to 7. After completion of condensation, there are added 2 parts of a mixture of mono- and disodium phosphate in the molar ratio of 1 : 1.2, and the water is evaporated off in vacuo. The dyestuff obtained dissolves in water to give a red colour, and dyes cotton in fast red shades.

Similar red dyestuffs are obtained if there are used, instead of 2,4-diaminotoluene, equivalent amounts of 1,6-diaminohexane, 2,6-diaminonaphthalene-4,8-disulphonic acid or 1,3-diaminobenzene-4-carboxylic acid.

EXAMPLE 29

By the procedure given in Example 25 there are condensed 40.2 parts of 4,4'-diaminodiphenylurea-2,2'-disulphonic acid with 37 parts of cyanuric chloride and subsequently with 42 parts of the disodium salt of 1,3-diaminobenzene-4-sulphonic acid, and diazotisation is then performed. The tetrazo compound is combined with a neutral suspension of 110 parts of the secondary condensation product from 2-aminobenzene-1-sulphonic acid, 2,4,6-trifluoro-1,3,5-triazine and 6-amino-1-naphthol-3-sulphonic acid (disodium salt), and coupling is completed by the addition of sodium bicarbonate at pH 7. The resulting dyestuff is salted out, filtered off and dried. It dyes cellulose fibres in fast orange shades.

If there are used, instead of 37 parts of cyanuric chloride, 28 parts of 2,4,6-trifluoro-1,3,5-triazine, then there is obtained the corresponding dyestuff containing four reactive fluorine atoms, which dyestuff has similar dyeing properties.

DYEING INSTRUCTION I 2 parts of the tetrareactive disazo dyestuff obtained according to Example 1 are dissolved, with the addition of 0.5 part of the sodium salt of m-nitrobenzenesulphonic acid, in 100 parts of water. The solution obtained is used to impregnate a cotton fabric in such a manner that its weight increases by 75%; the impregnated fabric is subsequently dried.

The fabric is afterwards impregnated with a solution at 20° containing per liter 5 grams of sodium hydroxide and 300 grams of sodium chloride, and is subsequently squeezed out to 75% increase in weight; the dyeing is then steamed for one minute at 100° to 101°, rinsed, soaped for quarter of an hour in a boiling 0.3% solution of an ion-free detergent, rinsed and dried. There is obtained a red dyeing having fastness to washing and to light.

DYEING INSTRUCTION II 2 parts of the tetrareactive disazo dyestuff obtained according to Example 1 are dissolved in 100 parts of water.

The solution is added to 3900 parts of cold water; 80 parts of sodium chloride are added, and there are then introduced into this dyeing bath 100 parts of a cotton fabric. The temperature is raised in 45 minutes to 90°, with additions being made after 30 minutes of 40 parts of trisodium phosphate and of a further 80 parts of sodium chloride. The temperature is maintained at 90° for 30 minutes; the dyeing is subsequently rinsed and then soaped for 15 minutes in a boiling 0.3% solution of an ion-free detergent. There is obtained a red dyeing having fastness to washing and to light.

PRINTING INSTRUCTION 2 parts of the tetrareactive disazo dyestuff obtained according to Example 1 are sprinkled, with rapid stirring, into 100 parts of a stock thickening containing 45 parts of a 5% sodium alginate thickening, 32 parts of water, 20 parts of urea, 1 part of the sodium salt of m-nitrobenzenesulphonic acid as well as 2 parts of sodium bicarbonate.

With the printing paste thus obtained there is printed a cotton fabric on a roller printing machine, and the resulting printed material is steamed for 8 minutes at 100° in saturated steam. The printed fabric is then thoroughly rinsed in cold and hot water, with the constituents not chemical fixed being very easily removable from the fibres, and the rinsed fabric is subsequently dried.

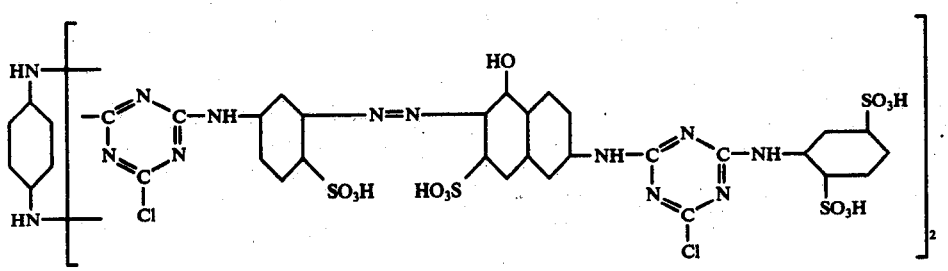

We claim:
1. In a fiber-reactive dyestuff composition containing
   1. a fiber-reactive dyestuff, and
   2. a diluent, buffer or mixtures thereof; the improvement wherein the dyestuff is a tetrareactive dyestuff of the formula

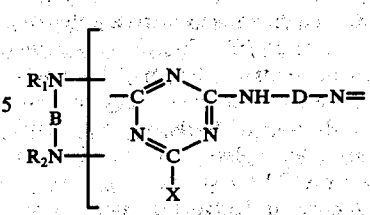

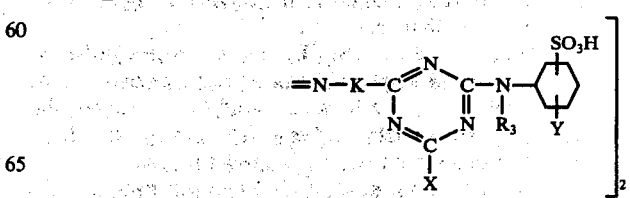

wherein

D is phenylene substituted by sulfo and is further unsubstituted or substituted by methyl, ethyl, isopropyl, butyl, methoxy, ethoxy, ethoxyethoxy, isopropoxyisopropoxy, acetyl, acetylamino, benzoylamino, ureido, carboxy, chloro or bromo;

K is

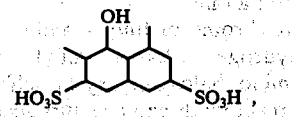

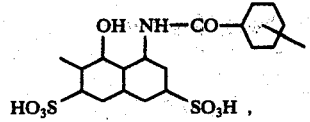

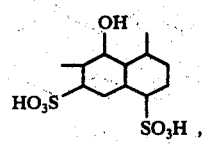

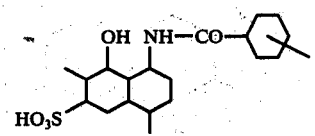

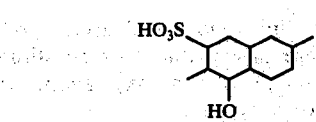

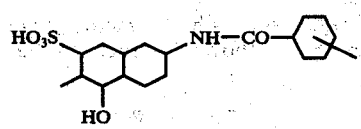

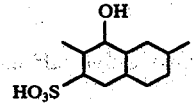

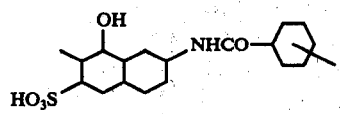

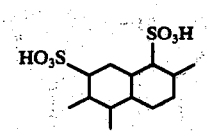

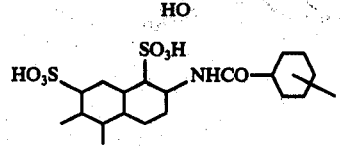

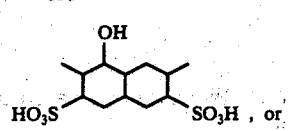, or

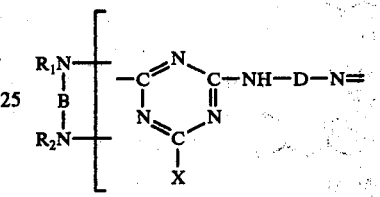

;

B is straight or branched chain alkylene of 1–6 carbon atoms or cyclohexylene, or is naphthylene, diphenylene, stilbenylene, or phenylene which are unsubstituted or substituted by halo, lower alkyl, lower alkoxy, amino, ureido, hydroxy, carboxy or sulfo;

$R_1$, $R_2$ and $R_3$ independently are hydrogen or alkyl of 1–6 carbon atoms;

X is chloro, bromo or fluoro; and

Y is hydrogen, lower alkyl, lower alkoxy, acetylamino, halo, carboxy or sulfo.

2. A tetrareactive disazo dyestuff of the formula

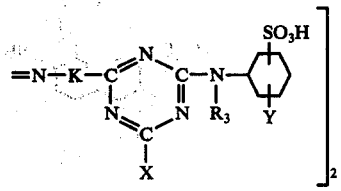

wherein

D is phenylene substituted by sulfo and is further unsubstituted or substituted by methyl, ethyl, isopropyl, butyl, methoxy, ethoxy, ethoxyethoxy, isopropoxyisopropoxy, acetyl, acetylamino, benzoylamino, ureido, carboxy, chloro or bromo;

K is

K is

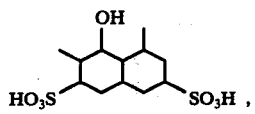

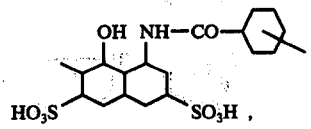

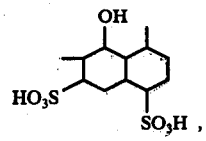

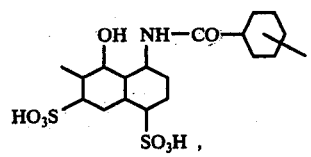

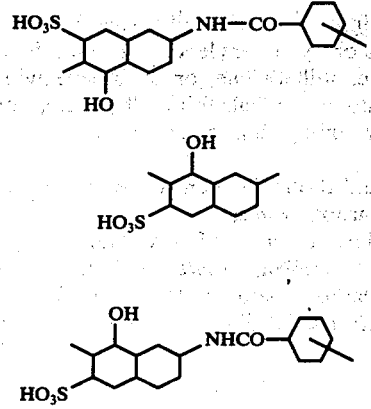

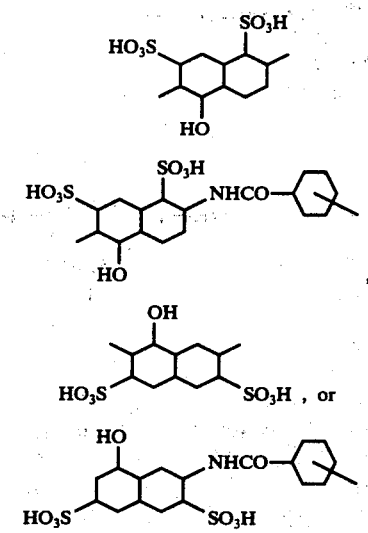

B is straight or branched chain alkylene of 1–6 carbon atoms or cyclohexylene, or is naphthylene, diphenylene, stilbenylene, or phenylene which are unsubstituted or substituted by halo, lower alkyl, lower alkoxy, amino, ureido, hydroxy, carboxy or sulfo;

$R_1$, $R_2$ and $R_3$ independently are hydrogen or alkyl of 1–6 carbon atoms;

X is chloro, bromo or fluoro; and

Y is hydrogen, lower alkyl, lower alkoxy, acetylamino, halo, carboxy or sulfo.

3. A tetrareactive disazo dyestuff according to claim 2, wherein

D is 4-sulfophen-(1,3)-ylene;

K is

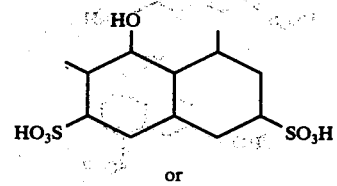

or

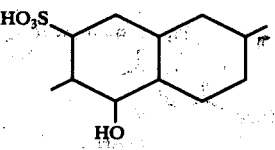

B is naphthylene, diphenylene, stilbenylene, or phenylene which are unsubstituted or substituted by halo, lower alkyl, lower alkoxy, amino, ureido, hydroxy, carboxy or sulfo;

$R_1$, $R_2$ and $R_3$ are hydrogen;

X is chloro;

Y is hydrogen, sulfo, chloro, methyl or carboxy and wherein Y is ortho with respect to the

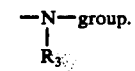

4. Tetrareactive disazo dyestuff according to claim 2 of the formula

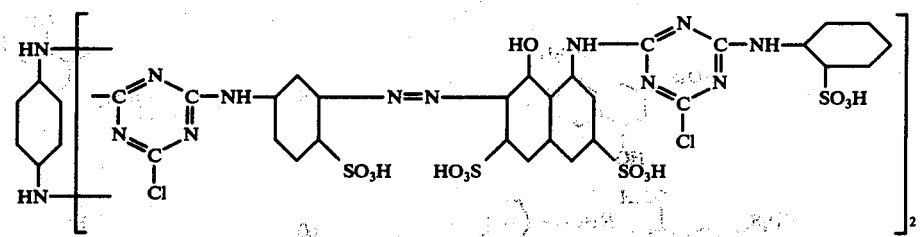

5. Tetrareactive disazo dyestuff according to claim 2 of the formula